No. 733,389.

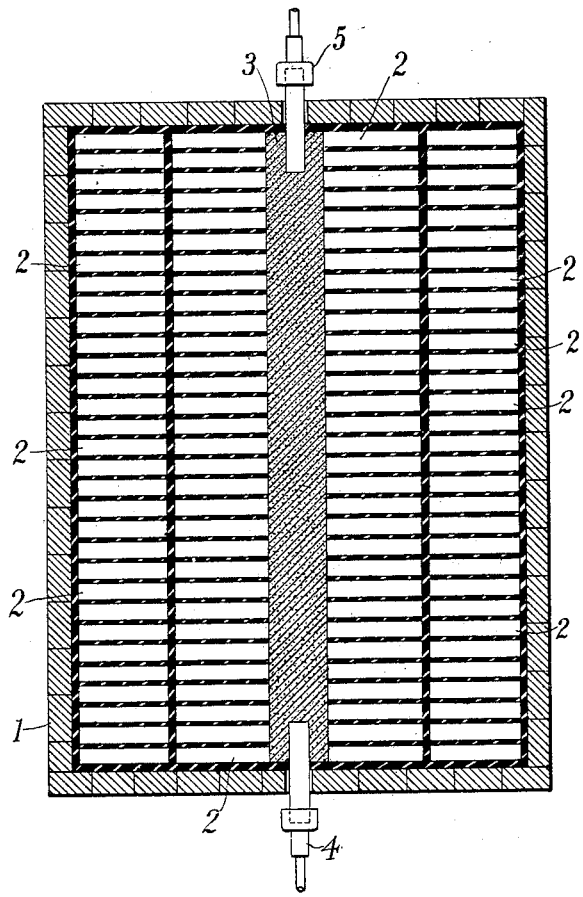

Patented July 14, 1903.

UNITED STATES PATENT OFFICE.

CHARLES M. HALL, OF NIAGARA FALLS, NEW YORK.

PROCESS OF REMOVING SILICA FROM COKE.

SPECIFICATION forming part of Letters Patent No. 733,389, dated July 14, 1903.

Application filed September 24, 1902. Serial No. 124,609. (No specimens.)

*To all whom it may concern:*

Be it known that I, CHARLES M. HALL, a citizen of the United States, residing at Niagara Falls, in the county of Niagara, State of New York, have invented a certain new and useful Process of Removing Silica from Coke, of which the following is a specification.

In the manufacture of aluminium and other metals by electrolytic processes it is well known that the carbon used in the electrodes should be substantially free from silicon compounds and particularly silica. The electrodes used in certain of the electrolytic processes just mentioned are consumed in the operation and the silica originally contained in the carbon is taken up by the aluminium, thus yielding an impure product. In order to avoid this and to shorten the process of producing aluminium, it has been proposed to use in the electrodes petroleum-coke, a residue from the distillations in the refining of crude oil, for the reason that such coke is usually free from silica, or practically so. Petroleum-coke, however, is more expensive than the other kinds. For this reason it is desirable to purify the ordinary and cheaper material by removing the silica, so that it may be used with equally good results, and this led me to the present invention.

The process which forms the subject of this application is a novel method of removing all or the greater part of the silica contained in coke; and it consists, broadly stated, in mixing with the material to be treated a metallic fluorid which will react with the silica, giving a fluorid of silicon which goes off as a gas during the baking, hereinafter to be described. For this purpose I have used a number of different fluorids, good results being obtained with sodium fluorid, cryolite, and fluorspar.

In carrying out my process the coke should be pulverized, after which it is mixed with one of the substances mentioned—as, for example, sufficient sodium fluorid to remove all or the greater part of the silica as silicon fluorid. The powdered coke and fluorid is then mixed with pitch or other suitable binder in the usual way and formed into blocks or whatever form of carbon is desired. These are then baked, as is customary in the manufacture of carbons, to expel the volatile matter. An efficient and economical method of baking is that described in my Patent No. 705,076, dated July 22, 1902. The temperature at which the articles are baked should not be lower than in the ordinary process, but rather somewhat higher, to facilitate the chemical action now to be described. The contained fluorid—as, for example, sodium fluorid—reacts with the silica, forming silicon fluorid. The latter compound is a gas at ordinary temperatures and of course goes off at the high temperature of the furnace, and there thus remains in the carbons none or only a small part of the silica originally contained therein.

The accompanying drawing shows in horizontal section a furnace for baking carbons—such, for example, as is shown and described in my patent mentioned above.

The wall of the furnace, preferably built up of brick, is indicated by 1, and the carbon articles, insulated from each other as shown, are designated by 2.

3 is a core of suitable material adapted to be raised to a regulated temperature by a current of electricity, preferably alternating, supplied from electrodes 4 5. The insulation of the articles from each other enables the operator to confine the current substantially to the core 3, which renders the desired regulation of temperature in the furnace more readily accomplished. After the baking is completed the electrodes 2 may be removed by dismantling the furnace or may be taken out through a suitable opening in the wall of the same.

In one of the practical applications of my process the material treated was the variety known as "Pocahontas" coke, which was found to yield ash to the amount of 4.40 per cent. of its original weight. The principal constituents of this ash were found by analysis to be as follows, in the proportions following each: $SiO_2$, 44.98 per cent.; $Fe_2O_3$, 14.53 per cent.; $Al_2O_3$, 28.27 per cent.; $CaO$, 3.45 per cent.; $TiO_2$, 3.51 per cent.; $Na_2O$, 2.25 per cent. There were also found small quantities of manganese and magnesium oxids.

Coke of the above kind was mixed with other materials as follows, the proportions being by weight: one hundred and thirty parts coke, sixty parts hard pitch, seven parts tar, ten parts sodium flourid—NaF. The resulting mixture was formed into suitable blocks and then thoroughly baked, during which latter operation a chemical reaction took place, which I believe to be $$SiO_2 + 4NaF = SiF_4 + 2Na_2O.$$

It is probable that the sodium oxid combines with the alumina in the ash, yielding sodium aluminate, $Na_2Al_2O_4$, and if so the process will be facilitated by adding a small proportion of alumina to the mixture, alumina not being an impurity for the purpose for which the electrodes are chiefly used. The carbons were then examined, and it was found that the ash had been reduced from 4.40 per cent. of the total weight to 3.57 per cent. Of this latter the titanium dioxid was reduced to 3.31 per cent. and the sodium oxid was increased to 13.78 per cent.; but at the same time the silica was reduced to 18.32 per cent., less than one-half the amount in the coke before being treated. The carbons were therefore well adapted for use in the electrolytic processes heretofore referred to.

Instead of mixing the coke, fluorid, and pitch and forming them into the desired shape before baking, thereby combining in one process both the purification of the coke and the manufacture of electrodes therefrom, the purifying steps may be carried out separately by heating the mixture of coke and fluorid alone.

While I prefer the former method, I may mention one advantage in dividing the process—namely, that the material then receives two heatings, thus insuring the completion of the desired chemical reactions.

Having now fully described my invention, what I claim is—

1. The herein-described process of purifying carbon containing silica, which consists in mixing with the same a metallic fluorid, and subjecting the mixture to heat until the fluorid has combined with the silica to form silicon fluorid, as set forth.

2. The herein-described process of purifying carbon containing silica which consists in mixing the same with sodium fluorid, and subjecting the mixture to heat until the fluorid has combined with the silica to form silicon fluorid, as set forth.

3. The herein-described process of purifying carbon containing silica, which consists in mixing the same with a metallic fluorid, mixing the carbon and fluorid with a suitable binder, forming the resulting material into articles, and subjecting the articles to heat until the fluorid has combined with the silica to form silicon fluorid, as set forth.

CHARLES M. HALL.

Witnesses:
WM. L. CLARK,
JOHN E. SHERO.